(12) United States Patent
Yoshida et al.

(10) Patent No.: US 7,486,440 B2
(45) Date of Patent: Feb. 3, 2009

(54) POLARIZED TOTAL INTERNAL REFLECTION ILLUMINATION OPTICAL SYSTEM BY ROTARY ANNULUS LIGHT

(75) Inventors: Masasuke Yoshida, Kanagawa (JP); Toshiharu Suzuki, Tokyo (JP); Megumi Shio, Kanagawa (JP); Ryota Iino, Tokyo (JP)

(73) Assignee: Japan Science and Technology Agency, Saitama (JP)

( * ) Notice: Subject to any disclaimer, the term of this patent is extended or adjusted under 35 U.S.C. 154(b) by 566 days.

(21) Appl. No.: 10/539,757

(22) PCT Filed: Sep. 18, 2003

(86) PCT No.: PCT/JP03/11885

§ 371 (c)(1),
(2), (4) Date: Jun. 20, 2005

(87) PCT Pub. No.: WO2004/057402

PCT Pub. Date: Jul. 8, 2004

(65) Prior Publication Data

US 2008/0062513 A1    Mar. 13, 2008

(30) Foreign Application Priority Data

Dec. 20, 2002    (JP) ............... 2002-370455

(51) Int. Cl.
*G02B 21/06* (2006.01)
(52) U.S. Cl. ............ 359/387; 359/213; 359/220
(58) Field of Classification Search .......... None
See application file for complete search history.

(56) References Cited

U.S. PATENT DOCUMENTS 5,481,384 A * 1/1996 Kramer et al. ............ 359/17

FOREIGN PATENT DOCUMENTS

| JP | 08-122036 A | 5/1996 |
|---|---|---|
| JP | 09-159922 A | 6/1997 |
| JP | 2003-131141 A | 5/2003 |

OTHER PUBLICATIONS

International Search Report mailed on Nov. 18, 2003.

* cited by examiner

*Primary Examiner*—Stephone B Allen
*Assistant Examiner*—Derek S Chapel
(74) *Attorney, Agent, or Firm*—Rader, Fishman & Grauer, PLLC

(57) ABSTRACT

An illumination system uses rotatable, polarized illumination optics to detect the direction of highly efficient excitation of fluorescent dyes coupled to a sample, or the absorption transition moment, using information on the direction of maximal fluorescence intensity, in which it is possible to detect individual dynamic changes in the internal structure or orientation of an entire protein molecule by coupling a single fluorescent dye molecule to the protein molecule. The polarized total internal reflection illumination optical system by rotary annulus light is also an illumination optical system in which laser beams are introduced into the objective lens of a microscope at the peripheral region by means of the rotatable illumination direction of the laser beams, and is designed to illuminate by the evanescent field that contains only transverse components that are perpendicular to the direction of radiation from the optical axis of the objective lens.

5 Claims, 6 Drawing Sheets p-polarized light s-polarized light

POLARIZED TOTAL INTERNAL REFLECTION ILLUMINATION OPTICAL SYSTEM BY ROTARY ANNULUS LIGHT

TECHNICAL FIELD

The present invention relates to a polarized total internal reflection illumination optical system by rotary annulus light of an illumination system that introduces laser beam into a peripheral region of an objective lens of a microscope, in which the direction of illumination of the laser beam is rotatable, and specifically, to a polarized total internal reflection illumination optical system by rotary annulus light capable of detecting the absorption transition moment of single fluorescent molecules using a polarized evanescent field.

BACKGROUND OF THE INVENTION

Conventional technology has been described in patent reference 1 (Patent application No. 2001-325773). An overview of the rotary annulus illumination type total reflection optical system, will be described below.

The Köeller optics system that illuminates an object by introducing laser beam into a peripheral region of an objective lens of a microscope is characterized by laser beam whose illumination direction is rotatable while the illumination direction is inclined with respect to the axial center of the objective lens of the microscope. The illumination system of said rotary annulus light, total internal reflection illumination mechanism introduces laser beam into the objective lens of a microscope at the peripheral region to enable total internal reflection and excite fluorescent molecules by an evanescent field that is formed by total internal reflection. Said mechanism is also provided with a mirror that has a mechanism to finely adjust the inclination of the mirror to set the incidence of the laser beam at an optimal angle for the objective lens used. It also features a means to rotate the reflector. The rotating means, including mirror, is structured with a symmetrical shape and weight about the center of a rotation axis to prevent the adverse effect of vibration during reflective rotation of said mirror on the microscope.

The principle of total reflection illumination (evanescent illumination) that makes laser beam incident upon a peripheral region of an objective lens of a microscope so as to produce fluorescence using an evanescent field is briefly described below referring to FIG. 6.

In FIG. 6, 1 denotes the objective lens, 2 immersion oil, 3 a cover glass and 4 aqueous solution. Total internal reflection occurs on an interface between the glass and the aqueous solution when the laser beam is introduced into the objective lens 1 at the peripheral region (normally 61-degree inside and 68-degree outside angles). Rays appear at approximately 150 nm from the interface (the light filed is called an evanescent field). It is possible to significantly reduce background light and derive a high-contrast single fluorescent molecule image by using this evanescent field for fluorescent illumination.

The conventional technology described above can generate high-contrast single fluorescent molecule image but it is not possible to detect the orientation, that is, the absorption transition moment, of a single fluorescent dye molecule. The absorption transition moment of a fluorescent dye is the direction in which the probability of the molecule being excited is the highest, which is determined by the molecular structure of the fluorescent dyes. The intensity of fluorescence emitted from the fluorescent dyes reaches the maximum level when the direction of polarization of the excitation light coincides with absorption transition moment.

When the light incident on the aqueous solution 4 via the cover glass (3) comprises p-polarized light, the resultant evanescent field has a transverse (X-axis) component (2) and a longitudinal (Z-axis) component (1) as shown in FIG. 7.

When s-polarized light is incident, the evanescent field comprises only perfect transverse waves (a Y-axis component) as shown in FIG. 8. (Refer to Kunio Tsuruta, Applied Optics I [Applied Physical optics Series 1] p37-42, Total internal reflection and Evanescent Waves, for a detailed description.)

The absorption transition moment of fluorescent dyes is detected by rotating about the Z-axis the transverse component arrayed on the X-Y plane in the evanescent field. The intensity of the longitudinal component does not contribute to the detection of the absorption transition moment because it does not vary due to the rotation. When p-polarized light is incident, the evanescent field has both transverse and longitudinal components with decreasing intensity for the transverse component. On the other hand, when s-polarized light is incident, the resultant evanescent field has only the transverse component, and this makes it possible to efficiently detect the absorption transition moment of the fluorescent dye. When a single fluorescent dye molecule is firmly conjugated to a single molecule of an observation sample, such as a protein or DNA by covalent bond, change in the internal structure of the orientation of the sample or change of the whole can be detected as change of the orientation of the absorption transition moment at a single molecule level.

To generate such an evanescent field containing only a transverse component (i.e., oscillation in the Y-axis direction), s-polarized light oriented perpendicular to the radial direction from the optical axis (meridional plane) (reference numbers 5 and 6 in FIG. 6) must be incident on and reflected from the objective lens. If polarized rays are simply incident on the objective lens when a polarizer is rotated, not only s-polarized but also p-polarized light will be incident on the interface between the cover glass 3 and the aqueous solution 4. The resultant evanescent field will contain both longitudinal (Z-axis) and transverse (X-Y axis) components. The longitudinal (Z-axis) component does not contribute to the detection of the absorption transition moment of fluorescent dye since the longitudinal (Z-axis) component remains constant irrespective of a position of the incident laser beam. Although the transverse (X-Y axis) component rotates about the Z-axis when the position of the incident beams change, the intensity of the beam decreases because of the presence of the longitudinal component, thereby making it difficult to detect the absorption transition moment efficiently. It is difficult for the conventional simple polarized illumination system described above to detect the orientation of the absorption transition moment of fluorescent dyes.

The polarized total reflection illumination optical system by rotary annulus light of the present invention is to detect the orientation of the absorption transition moment of fluorescent dye by introducing s-polarized light oriented perpendicularly to the direction of the radiation from the center of the optical axis of the objective lens (meridional plane), and by forming an evanescent field containing only a transverse component by turning the incident rays about the optical axis of the objective lens at a low speed.

When a single fluorescent dye molecule is firmly coupled by covalent bond to a single molecule of an observation sample, such as a protein or DNA, the change in the internal structure and the orientation of the whole sample can be detected as change of the orientation of the absorption transition moment of fluorescent dye at a single molecule level.

The conventional system described above lacks the means to convert the annulus rays incident on the objective lens into the shape of a true circle (e.g., by means of the addition of a beam-correction prism). When parallel beam is incident at 45 degrees from the rotational center of a rotary reflector, the reflected orbicular rays are elliptic in shape. To form the beam into a true circle shape, an anamorphic prism pair which is used for semiconductor laser beam-shaping may be used.

The present invention offers annulus illumination rays of a true circular shape to achieve ideal evanescent illumination in which the primary and secondary diffraction of light, which is the major cause of noise, is removed.

DISCLOSURE OF THE INVENTION

To achieve the above purpose, the present invention uses the technical solutions, that is a polarized total reflection illumination optical system by rotary annulus light in which laser beam is introduced into the objective lens of a microscope at the peripheral region, with the direction of illumination of the laser beam rotatable, wherein illumination is always carried out with s-polarized light that are perpendicular to the radial direction from the optical axis of the objective lens.

Further in a polarized total internal reflection illumination optical system by rotary annulus light, a drive means to rotate a polarizer and mirror unit in which a polarizer to adjust the polarizing direction of the laser beam and a tiltable mirror in order to rotate parallel beam from laser light source form annulus light are integrated, is provided.

Moreover, in a polarized total internal reflection illumination optical system by rotary annulus light, laser beam from the laser light source is expanded by a beam expander that has a spatial filter such that a diameter thereof is increased to up to one half the average diameter of the annulus light, and then the expanded beam is introduced into the rotary polarizer and mirror unit, whereby the need for using an annulus zone diaphragm is effectively eliminated.

In addition, in a polarized total internal reflection illumination optical system by rotary annulus light, the laser beam from a laser light source is introduced into the rotary polarizer and mirror unit via a small 45-degree mirror placed at the center of a collector lens, and the annulus parallel beam reflected from the polarizer and mirror unit is collected at a back focal plane of the objective lens via a peripheral region of the collector lens.

Further, in a polarized total internal reflection illumination optical system by rotary annulus light, an index pin is placed in front of the front focal plane of said collector lens (near the field diaphragm plane) of the illumination system and is inserted at about the center of the optical axis to detect the period of rotation and direction of vibration of the rotating laser beam in the field of the microscope.

BEST MODE OF IMPLEMENTING THE INVENTION

The structure of the polarized total reflection illumination optical system by rotary annulus light of the present invention is explained below with reference to the attached drawings.

Figure 1:
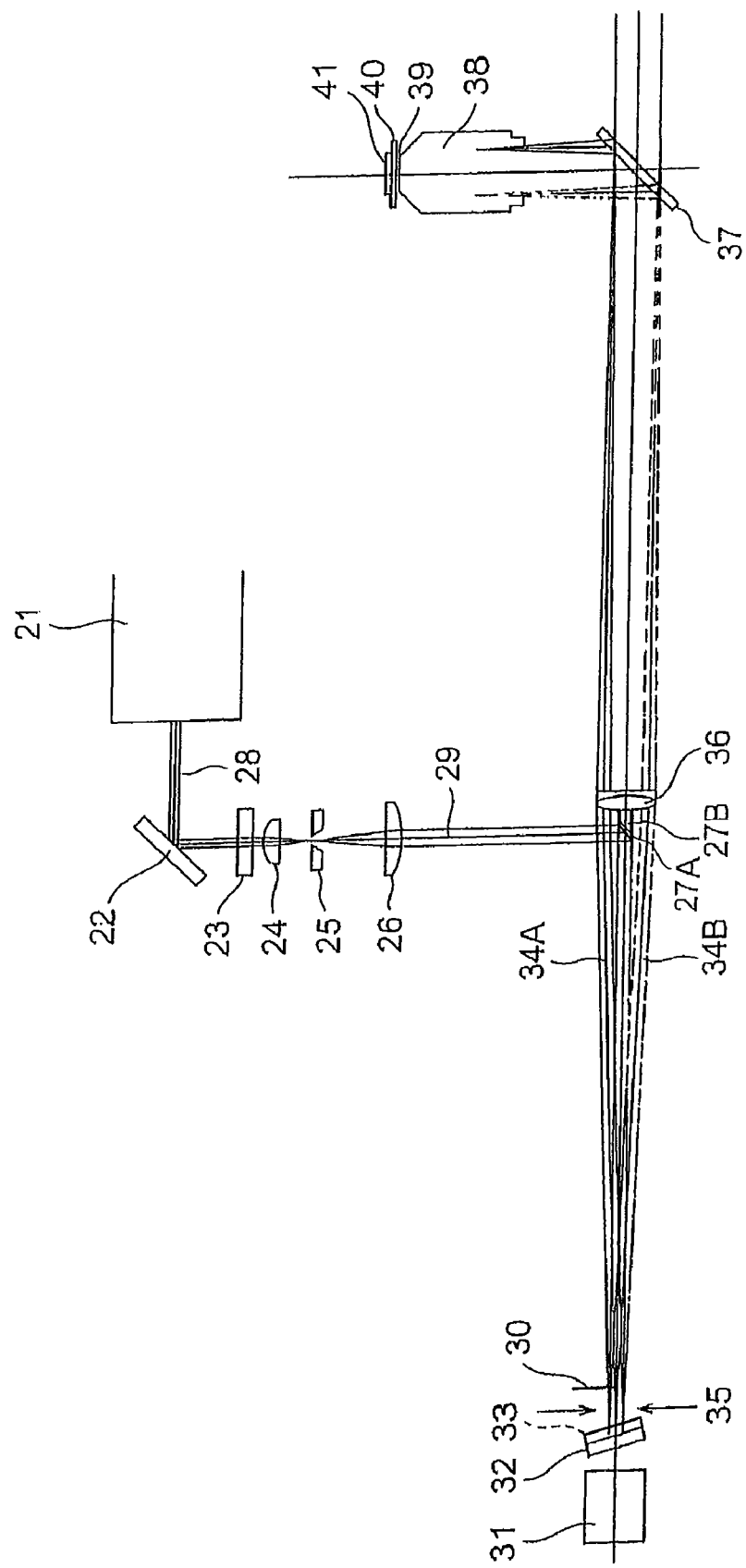
FIG. 1 shows a diagram of an embodiment of the polarized total internal reflection illumination optical system by rotary annulus light of the present invention.
Figure 2:
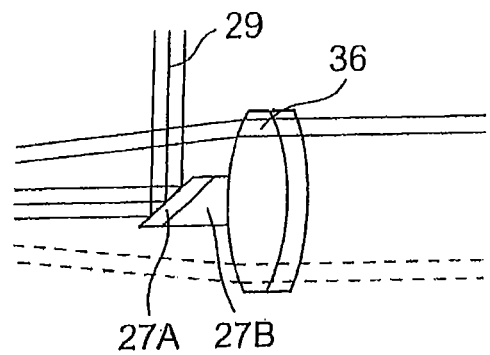
FIG. 2 is an enlarged view of a 45-degree small mirror and the collector lens.
Figure 3:
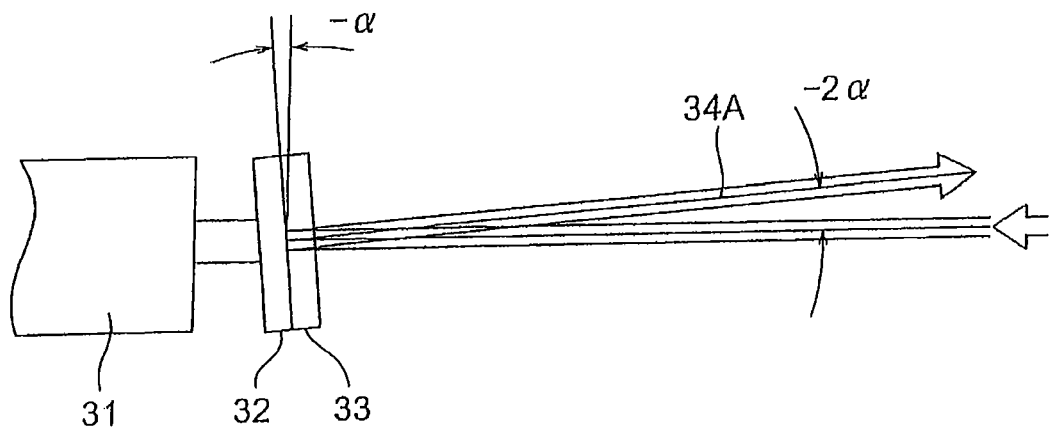
FIG. 3 is an enlarged view of the rotary polarizer and mirror unit (inclined by −α)
Figure 4:
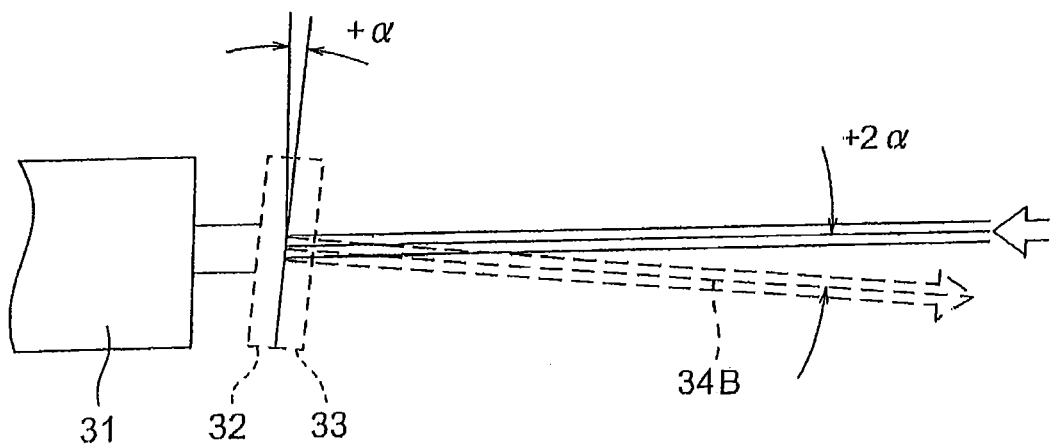
FIG. 4 is an enlarged view of the rotary polarizer and mirror unit (inclined by +α)

FIG. 1 shows an embodiment of the polarized total internal reflection illumination optical system by rotary annulus light of the present invention. FIG. 2 is an enlarged view of the 45-degree small mirror and the collector lens. FIG. 3 is an enlarged view of the rotary mirror unit (inclined by −α). FIG. 4 is an enlarged view of the rotary mirror unit (inclined by +α).

In the figures, 21 denotes a laser light source, 22 a reflective mirror, 23 a quarter wavelength plate, 24 a first convex lens, 25 a spatial filter, 26 a second convex lens, 27A a small 45-degree incident mirror,(see FIG. 2), 27B a mounting fixture (see FIG. 2), 28 emission port beam, 29 expanded beam, 30 an index pin, 31 a variable-speed motor used as a drive means, 32 a rotary mirror in the polarizer and mirror unit, 33 a polarizer fixed on the mirror 32, 34A expanded beam with −2α inclination, 34B expanded beam with +2α inclination, 35 a field diaphragm, 36 a collector lens, 37 a dichroic mirror, 38 an objective lens, 39 oil, 40 cover glass and 41 aqueous solution.

FIG. 1 shows an embodiment of the present invention. Laser beam emergent from the laser light source 21 is reflected on the mirror 22 at right angle, then passes the quarter wave plate 23 to be circularly polarized, and is focused at a position of the spatial filter 25 by the first convex lens 24. Although the beam has Gaussian distribution, zero-order rays with intensity distribution of $1/e^2$ or less as well as primary, secondary and other diffraction of light is excluded from light passing through pinholes of the spatial filter 25. The resultant rays become parallel again by the second convex lens 26. (The size of the pinholes is defined by calculation and their positions are optically adjusted.) The first and the second convex lenses 24 and 26 and the spatial filter 25 together make up a convex-convex lens type beam expander.

Magnification for the emergent beam 28 and the expanded beam 29 are pre-determined for the respective laser light source 21 to be used. The expanded beam 29 should be such that the diameter of the beam after passing thought the beam expander is preferably one half or less of the average diameter of the annulus light.

The small 45-degree incident mirror 27A is fixed by adhesive or other means onto the mounting fixture which has a diameter one half or less of the average diameter of the annulus light and which is inclined by 45 degrees exactly. The mounting fixture is attached to the surface of the collector lens 36 as shown in FIG. 2. The expanded beam 29 travels from the small 45-degree incident mirror 27A to the rotary mirror 32. An index pin 30 is provided near the surface of the mirror 32. This position corresponds to the front focal plane of the collector lens 36. This index pin 30 is inserted at about the center of the optical axis so that the direction of rotation of the laser beams can be detected within the field of the microscope.

The rotary polarizer and mirror unit, as shown as the enlarged view of the mirror unit in FIG. 3 (inclined by −α). is equipped with a variable-speed motor 31 and a rotary mirror 32 that rotates on the plane perpendicular to the rotating center axis with an inclination of −α. A polarizer 33 is attached by adhesive or other means to the rotary mirror 32. These parts make up the polarizer and mirror unit.

When the rotary mirror 32 is inclined by −α, the expanded reflected beam 34A has an inclination of −2α as shown in FIG. 3. When the rotary mirror 32 is inclined by +α, the expanded reflected beam 34B has an inclination of +2α as shown in the enlarged view of the rotary mirror of FIG. 4.

Figure 5:
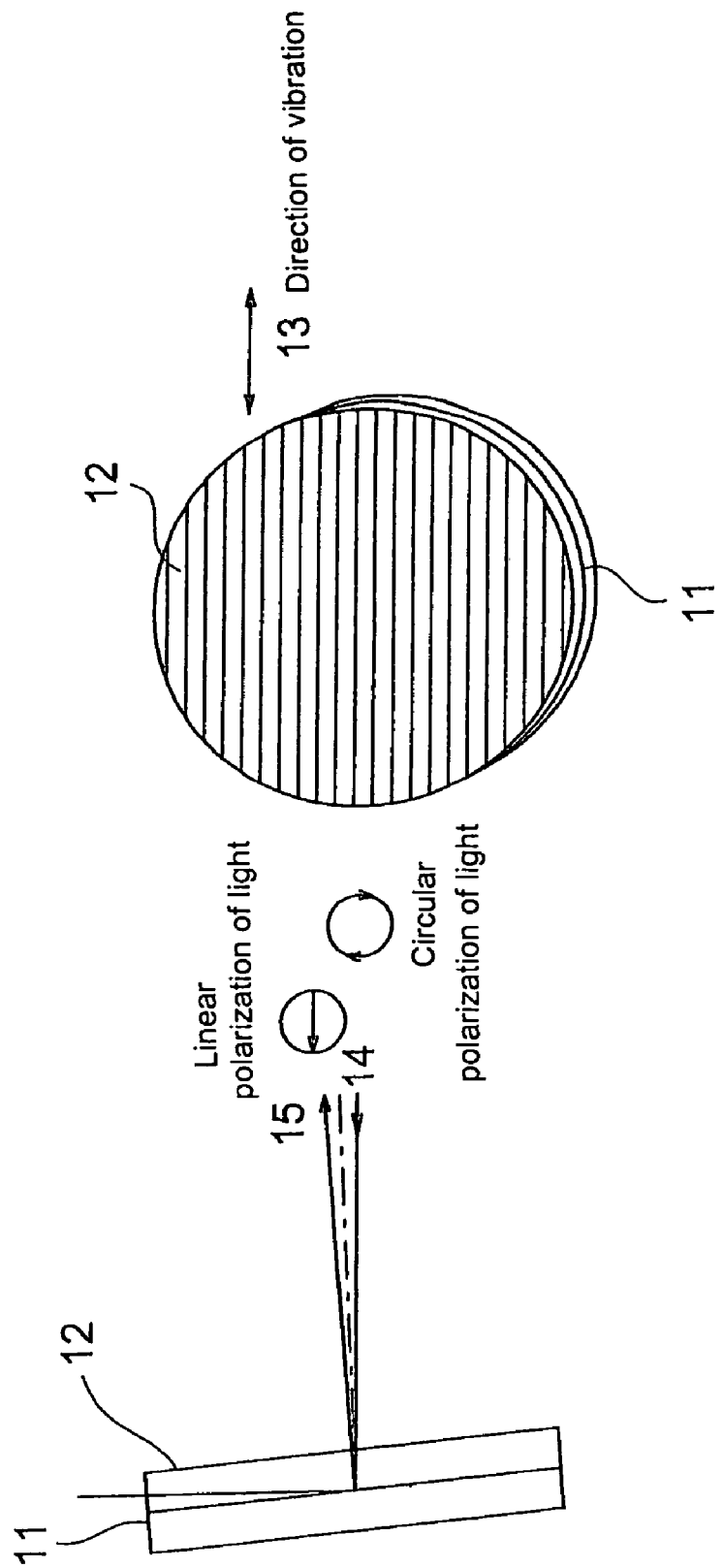
FIG. 5 is a diagram showing direction of inclination of the rotary mirror and the direction of vibration of the polarizer.

FIG. 5 shows the direction of inclination of the rotary mirror and the direction of vibration of the polarizer. The polarizer 12 is attached to the surface mirror 11 by adhesive or other means. The direction of vibration 13 of the polarizer 12 is adjusted to be perpendicular to the direction of inclination (angle of inclination) of the surface mirror 11.

The relative position of the polarizer and surface mirror as described above is realized by designing the direction of inclination of the surface mirror 11 and the direction of vibration 13 of the polarizer 12 to be perpendicular to each other. Alternatively, the direction of vibration of the polarizer 12 is designed to be rotatable and, after the surface mirror 11 is inclined by the required angle, the direction of vibration 13 of the polarizer 12 and direction of inclination (angle of inclination) of the surface mirror 11 are adjusted to be perpendicular to each other.

Figure 6:
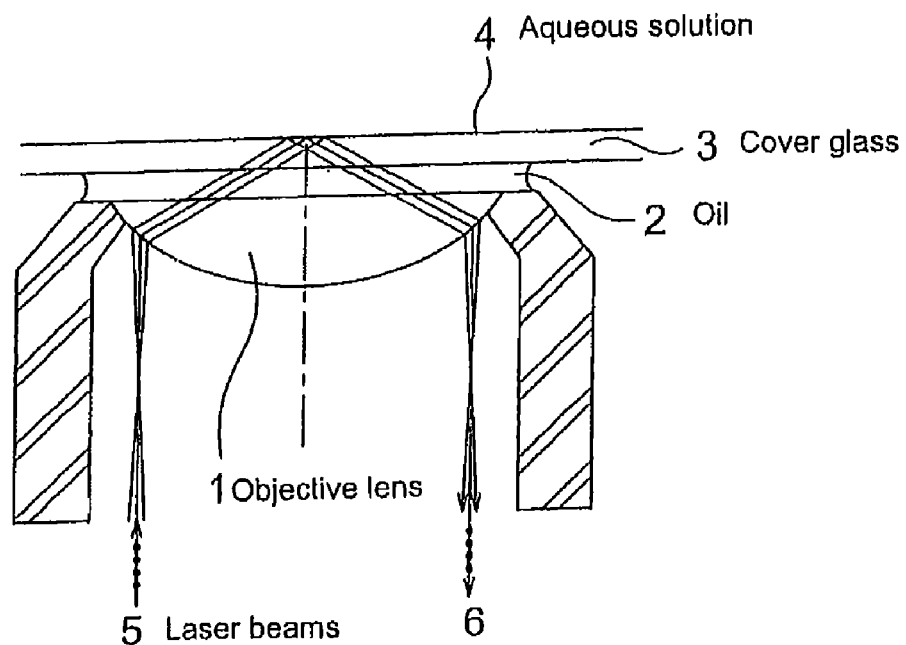
FIG. 6 is diagram showing the principle of total reflection illumination based on evanescent fields.
Figure 6:
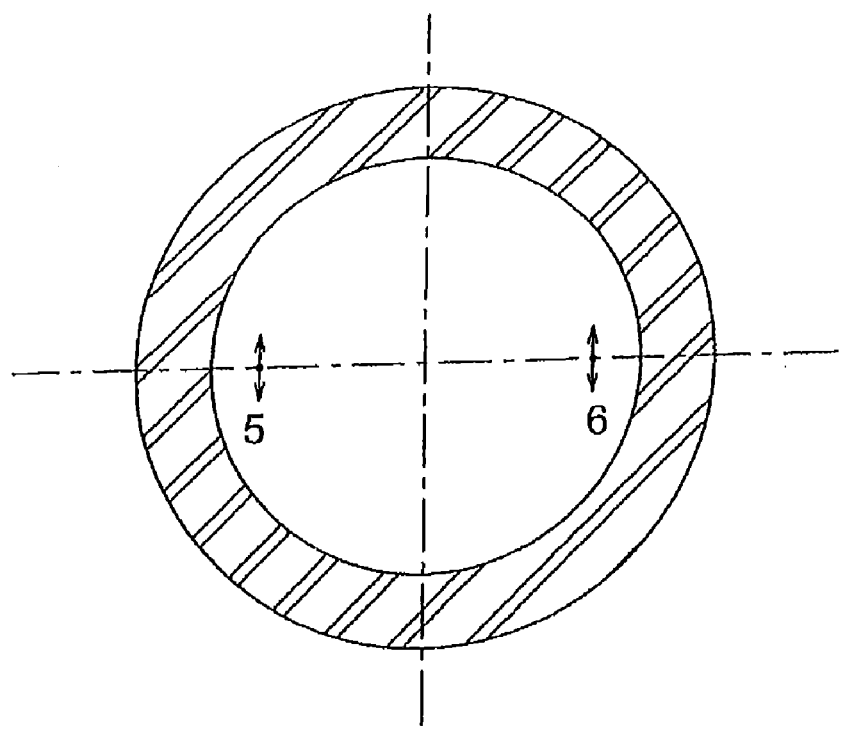
Figure 7:
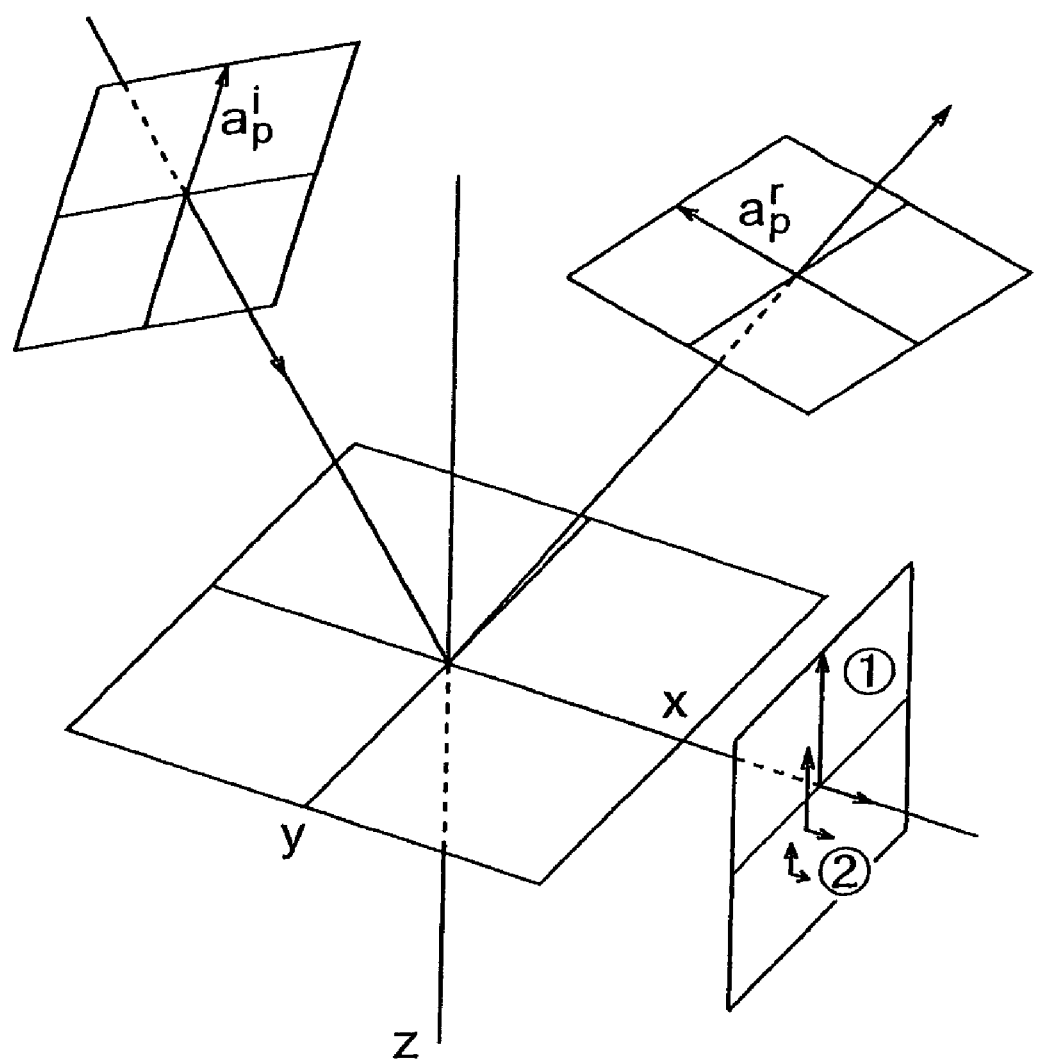
FIG. 7 is a diagram showing a propagation of evanescent waves when p-polarized light are incident.
Figure 8:
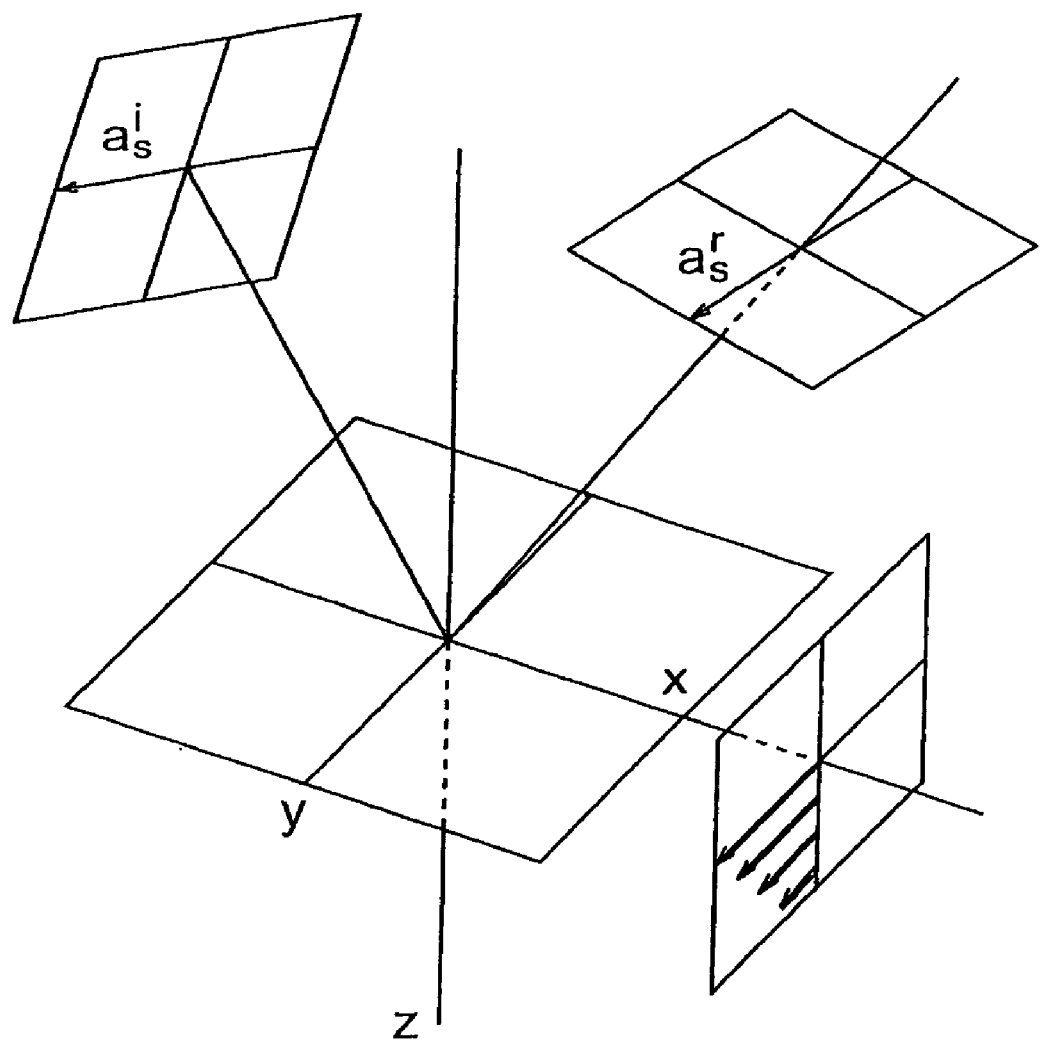
FIG. 8 is a diagram showing a propagation of evanescent waves when s-polarized light are incident.

In FIG. 5, the circular polarized light 14 becomes a linear polarized light 15 when it passes the polarizer 12. The beam reflected from the surface mirror 11 can illuminate with s-polarized light perpendicularly oriented to the radial direction from the center of the optical axis, and this satisfies the conditions of FIG. 6.

If the direction of vibration 13 of the polarizer 12 is adjusted to be parallel to the direction of inclination (i.e., the angle of inclination) of the surface mirror 11, the p-polarized light parallel with the direction of radiation from the center of the optical axis are used for illumination.

A field diaphragm 35 by means of an appropriate mechanism is provided near the rotary mirror 32 to eliminate unnecessary rays from emanating around the visual field. The expanded beam 34A and 34B (see FIG. 1) becomes parallel with the optical axis after passing the collector lens 36. The beams 5 reflected on the dichroic mirror 37 is focused on a back focal plane of the objective lens 38.

When the variable-speed motor 31 starts, an annulus light in the shape of a true circle is forced onto the back focal plane of the objective lens 38, then the light passes the oil 39 and reflects totally on the interface between the cover glass 40 and aqueous solution 41, and forms an evanescent field of approximately 150 nm distance from the interface. Any background rays are considerably reduced and a high-contrast image of single fluorescent molecule is obtained using the evanescent field for fluorescent illumination.

When the variable-speed motor 31 is rotated at a low speed, the maximum intensity of the fluorescence is obtained when the absorption transition moment of fluorescent dyes coincides with the direction of polarization of the evanescent field. The direction of the vibration of the polarized light, which are not usually visualized, can be easily detected because a portion of the visual field of the microscope is covered by the index pin 30. By applying the detection of polarization direction with index pin, one can, for example, measure the rotational speed of a single protein molecule with a covalently bound fluorescent molecule from the speed control system of the variable-speed motor 31.

The above constitutes the primary description of the intent of the present invention. The present invention may be implemented in various other forms of embodiment without deviating from the spirit of its main features. The above-mentioned embodiments are therefore only a few examples and should not be construed as limiting.

INDUSTRIAL APPLICABILITY

The present invention is used in the polarized total internal reflection illumination optical system by rotary annulus light to intentionally generate an evanescent field of a high level of polarization (i.e., without any polarized beams in the Z-axis direction) by introducing s-polarized light perpendicular to the radial direction from the center of the optical axis of the objective lens.

Rotary-polarized illumination systems can detect the direction of highly efficient excitation of fluorescent dyes, that is the absorption transition moment, using information on the direction of the maximal fluorescence intensity.

When a single fluorescent dye molecule is firmly coupled by covalent bond to single molecule of a sample, such as a protein or DNA, dynamic changes in the internal structure and orientation of the sample can be determined. Noise is eliminated by a spatial filter installed in the beam expander, and this makes it unnecessary to provide a conjugate plane with the back focal plane of the objective lens and to install an annulus diaphragm in the illumination optics. The illumination system of the present invention can be shorter because no additional relay lens system for providing the conjugate plane is necessary.

It is possible to detect the direction of the polarization of light because the period of rotation of the rotary laser beams can be detected within the visual field of the microscope.

It is possible to read the rotational speed of a sample coupled with a fluorescent molecule by covalent b from the speed control system of the variable-speed motor (31).

What is claimed is:

1. A polarized total internal reflection illumination optical system by rotary annulus light in which a laser beam is introduced into an objective lens of a microscope at a peripheral region, wherein the direction of illumination of the laser beam is rotatable and illumination is performed using s-polarized light that is perpendicular to a radial direction from the center of optical axis of the objective lens at all times.

2. The polarized total internal reflection illumination optical system by rotary annulus light according to claim 1, further including a drive means which rotates a unit that comprises a polarizer to adjust the direction of polarization of the laser beam and a tiltable mirror to form annulus light, so that the direction of illumination of the laser beam is rotated.

3. A polarized total internal reflection illumination optical system by rotary annulus light in which a laser beam from a laser light source is expanded by a beam expander provided with a spatial filter such that the laser beam diameter is increased to up to one half the average diameter of the annulus, and thereafter which the expanded beam is introduced into a rotary polarizer and mirror unit, effectively eliminating the need for the use of an annulus-diaphragm.

4. The polarized total internal reflection illumination optical system by rotary annulus light as stated in any one of claims 1 through 3 in which the laser beam is introduced into a rotary polarizer and mirror unit via a small 45-degree mirror placed at the center of a collector lens, and in which an annulus parallel beam, reflected from a polarizer and a mirror unit, is collected at the back focal plane of an objective lens via a peripheral region of said collector lens.

5. The polarized total internal reflection illumination optical system by rotary annulus light as stated in claim 4 in which an index pin is placed in front of the front focal plane of said collector lens and inserted at about the center of the optical axis to detect the period of rotation and direction of vibration of the rotating laser beam in a visual field of a microscope.

* * * * *